Aug. 8, 1950
C. R. NELSON
2,518,051
GARDEN CULTIVATOR
Filed Oct. 7, 1947
2 Sheets-Sheet 1
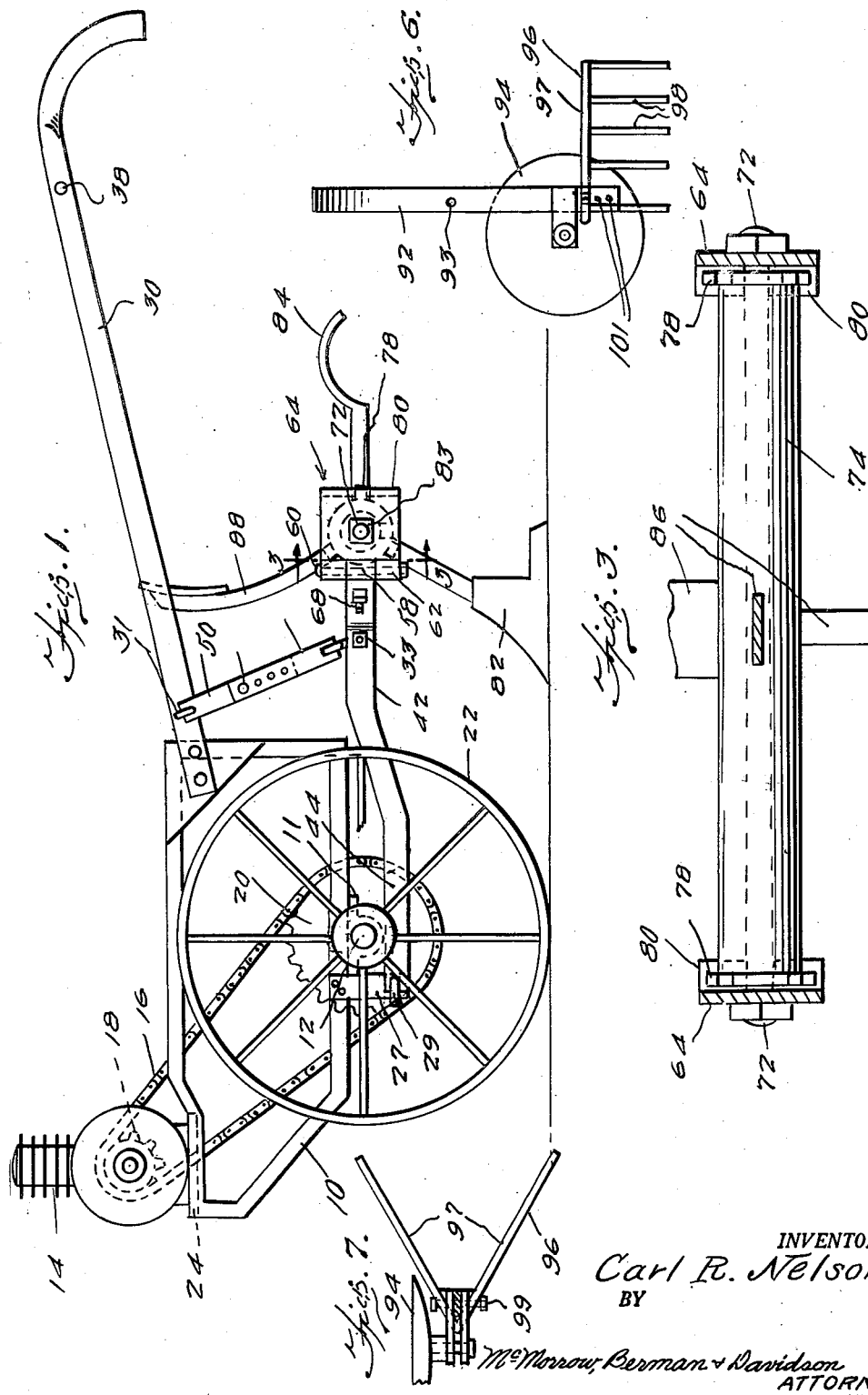
INVENTOR.
Carl R. Nelson
BY
McMorrow, Berman + Davidson
ATTORNEYS Aug. 8, 1950 — C. R. NELSON — 2,518,051
GARDEN CULTIVATOR
Filed Oct. 7, 1947 — 2 Sheets-Sheet 2
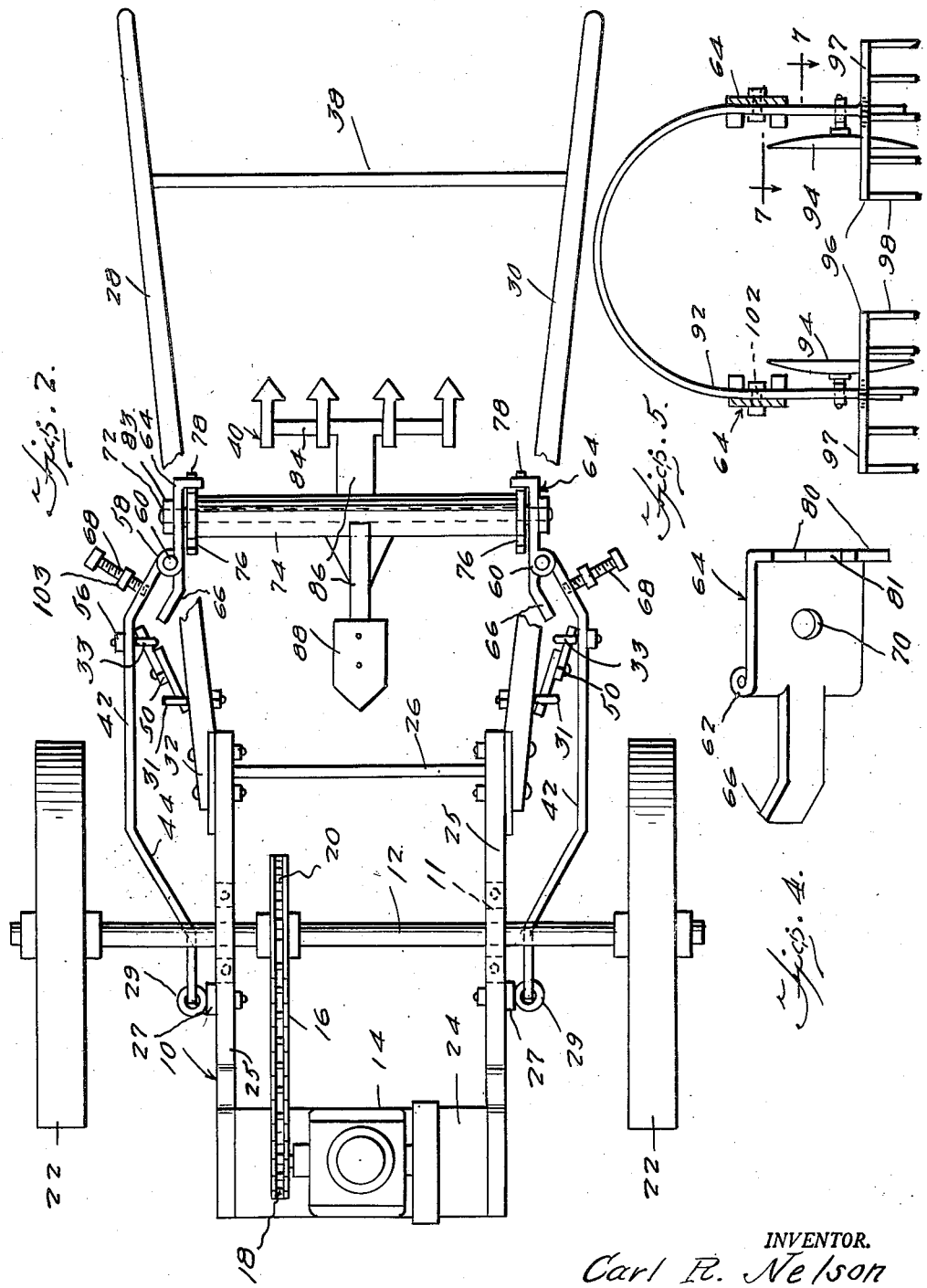
INVENTOR.
Carl R. Nelson
BY
McMorrow, Berman + Davidson
ATTORNEYS

Patented Aug. 8, 1950

2,518,051

UNITED STATES PATENT OFFICE 2,518,051

GARDEN CULTIVATOR

Carl R. Nelson, Kansas City, Mo.

Application October 7, 1947, Serial No. 778,489

1 Claim. (Cl. 97—48)

This invention relates to improvements in tractor and cultivator assemblies, and more particularly to an assembly including a garden or walking tractor, a set of cultivating implements attached to the tractor, and a flexible hitch between the tractor and the set of implements.

A large number of small tractors are now in use for gardening, lawn cultivation and similar purposes. The majority of these are two-wheeled devices powered by small gasoline engines of from one to five horse-power and provided with a pair of plow handles by means of which the tractor is guided and controlled by an attendant walking behind the tractor. Conventionally the cultivating implements are secured to such a walking tractor by a rearwardly extending tongue or bar rigidly attached to the tractor frame. With such an arrangement, if the tractor comes too close to a row being cultivated the handles must be moved toward the row in order to head the tractor away from the row, and the rigidly attached implement is then also moved toward or into the row, destroying a number of plants before the position of the tractor and implement relative to the row can be fully corrected. Conventional cultivating implements are provided as entirely independent, unitary devices so that it is necessary to detach one from the tractor and attach another in order to change the cultivating operation. Such implement replacement causes an important loss of time and a large amount of heavy manual labor as the implements usually have to be lifted into position and the implement and tractor moved relative to each other to uncouple one implement and couple another to the tractor.

It is among the objects of the present invention to provide an improved tractor and implement assembly wherein the implement is coupled to the tractor by a flexible or pivoted hitch which maintains the implement in operative position behind the tractor and provides for lifting of the implement by the tractor handles, and, at the same time, provides a sufficient freedom of lateral movement of the implement relative to the tractor so that the tractor may be turned away from a row of plants without moving the implement into the row or may be turned toward the row without moving the implement further away from the row, and may be conditioned, when desired, to provide a substantially rigid connection between the tractor and the implement, which assembly also provides several different implements permanently secured to a common mounting and connected to the tractor in a manner such that any one of the implements can be brought into operative position without uncoupling or coupling the tractor and such that the power of the tractor can be utilized to change the operative position of the implement, and whereby the multiple implement assembly can be entirely removed from the tractor and a different assembly substituted therefor when desired, and which tractor and implement assembly is simple, durable and economical in construction, is light in weight so as not to impose unnecessarily heavy loads on the tractor operator, is simple and easy to assemble and adjust, and may be used for long intervals without servicing or repair.

Other objects and advantages will become apparent from a consideration of the following description in conjunction with the accompanying drawing, wherein:

Figure 1 is a side elevation of a tractor and implement assembly illustrative of the invention.

Figure 2 is a top plan view of the assembly illustrated in Figure 1.

Figure 3 is a transverse cross-section showing, on an enlarged scale, an implement support operatively connected to the tractor, the plane of the cross-section being substantially on the line 3—3 of Figure 1.

Figure 4 is a perspective view of a hinge plate a pair of which are respectively connected to the opposite ends of the support illustrated in Figure 3.

Figure 5 is a vertical elevation of a modified form of implement support showing cultivating implements attached to the lower ends thereof.

Figure 6 is a side elevation of a modified form of implement support illustrated in Figure 5.

Figure 7 is a transverse cross-section taken substantially on the line 7—7 of Figure 5.

With continued reference to the drawings, the tractor comprises a substantially rectangular frame, generally indicated at 10, mounted intermediate its length on an axle 12 having a pair of wheels 22 secured one to each end thereof. The frame is journaled on the axle by suitable bearing blocks 11 and the wheels 22 are rigidly secured to the axle end portions to rotate with the axle. A power plant 14, illustrated as a small gasoline engine of conventional construction, is mounted upon the front end of the frame and provided with a drive sprocket 18 drivingly connected by a chain 16 with a sprocket 20 mounted on the axle 12. A suitable clutch is preferably interposed between the sprocket 20 and the axle and a clutch control is extended rearwardly from the clutch for control of the clutch by the operator of the tractor but, as these components are entirely conventional, illustration thereof has been omitted in order to simplify the drawings.

The frame has a front cross-member 24 upon which the engine 14 is supported and a rear cross-member 26 connecting together the rear ends of the frame side members 25. A pair of plow-type handles 28 and 30 are connected at their front ends to the rear end of frame 10, one at each side thereof, and extend rearwardly of the frame so that a person, walking behind the tractor, by grasping the rearward ends of the handles may control the direction of the tractor. Adjacent their rearward ends the handles are connected by a conventional rung 36 upon which the clutch control and the throttle or governor control of the engine may be conveniently mounted.

A pair of lugs 27 are attached respectively to the opposite side members 25 of the frame and project downwardly from the frame immediately ahead of the axle 12. These lugs are provided in their lower ends with apertures which receive the shanks of respective eye bolts 29 which extend outwardly of the frame one at each side thereof. A pair of spaced apart, parallel links 42 are respectively connected at their front or forward ends to the eye bolts 29 and extend rearwardly between the corresponding sides of the tractor frame and the adjacent wheels 22. These links are bowed outwardly intermediate their ends to bring them into substantially vertical alignment with the forward end portions of the respective handles 28 and 30 and are respectively connected to the adjacent handles by suitable struts 50. Each strut preferably has its upper end apertured and pivotally connected to an eye bolt 31 secured to the adjacent handle and its lower end apertured and connected to an eye bolt 33 secured to the corresponding link 42 intermediate the length thereof. Each strut may be formed in two separate pieces adjustably secured together so that the length of the struts 50 can be adjusted as desired.

Respective hinge plates 64 are pivotally connected to the rear ends of the links 42 by suitable hinge connections each of which may comprise a pair of spaced apart loops 62 formed on the forward edge of the corresponding hinge plate, a loop 58 formed on the rearward end of each link 42 and a hinge pin 60 extended through the aligned loops. Each hinge plate 64 may conveniently have a substantially rectangular shape and is provided with a substantially central aperture 70, and along the edge opposite the loops 62 with an outwardly extending flange 80 the center portion of which is cut away to provide a notch 81 for a purpose which will presently appear. Each hinge plate 64 is provided between the loops 62 on the forward edge thereof with a forwardly extending tongue 66 which overlies the rear end portion of the corresponding link 42 and a pair of set screws 68, threaded respectively through apertures in the rear end portions of the links 42, are engageable with the opposed faces of the tongue 66 when it is desired to lock the tractor hitch including the links 42 and hinge plates 64 against lateral swinging movements relative to the tractor frame.

In the arrangement shown in Figures 1 and 2, a tubular, cylindrical tool support 74 is disposed between the opposite hinge plates 64 and provided with substantially circular end plates 76 each of which has a plurality of angularly spaced radial extensions 78 engageable in the notches 81 of the respective hinge plates 64 to secure the tool support in a selected rotational position to the hinge plates and against rotation relative to the hinge plates except during selection of a desired rotational position of the support. A plurality of tools 82, 84 and 88 are secured to the support 74 and extend radially thereof at angularly spaced intervals therearound. As illustrated, the tools are connected to the support by suitable respective standards 86 secured at their inner ends to the mid-length portion of the tubular implement support.

In the illustrated arrangement the tool 82 is represented as a turning plow, the tool 84 as a toothed cultivator or weeder and the tool 88 as a shovel plow.

The tubular support 74 is secured to the hinge plates 64 by means of a bolt or rod 72 which extends through the support and through the apertures 70 of the hinge plates and is externally screw-threaded at its ends to receive nuts 83 which clamp the hinge plates 64 to the ends of the support.

With this arrangement, and with the set screws 68 threaded outwardly away from the tongue 66 and with one of the tools 82, 84 or 88 in operative position, the links 42 and hinge plates 64 provide a flexible hitch between the tractor and the tool support 74 so that when the rear ends of the handles are moved toward a row to head the tractor away from the row, the implement support and operative implement carried thereby will not be moved toward or into the row as is the case with conventional tractor hitches, but instead, the tool will be turned outwardly away from the row by the change in the angular position of the tractor axle relative to the row. The position of the tractor and implement relative to the row can thus be quickly and effectively adjusted without endangering any of the plants in the row being cultivated.

Figures 5, 6, and 7 illustrate a different form of tool support which may be attached to the hinge plates 64 when the tool support 74 is removed therefrom. This support comprises an inverted U-shaped yoke 92 having apertures 93, one in each leg thereof, which receive respective bolts 102 by means of which the legs of the yoke are secured to the corresponding hinge plate 64. The rearward edges of the legs of the yoke rest against the flanges 80 of the corresponding hinge plates to hold the yoke against rotation relative to the hinge plates about the connecting bolts 102. In use, the yoke 92 may be positioned to straddle a row being cultivated and carry a row cultivator 96 at the lower end of each leg thereof.

In the arrangement illustrated, the implements 96 are V-shaped weeders having upper frames 97 and depending teeth 98. Each implement is secured to the lower end of the corresponding yoke leg by a suitable bolt 99 passing through suitable apertured lugs secured to the frames 97 near the point thereof and through one of a series of apertures 101 provided in the lower ends of the legs. Preferably, a pair of vanes or discs 94 are secured one to the lower end of each yoke leg in position to engage the ground slightly in advance of the implement 96 to hold these implements against sudden lateral movements which might endanger the plants in the row being cultivated. The discs are provided mainly as guides but, if desired, may be adjusted to perform a cultivating function such as that of ridging the earth up along each side of the row.

With the modified tool support 92 attached to the hinge plates 64 the links 42 provide a flexible hitch for the tool support which operates in the same manner as described above in connection with the tool support 74. As explained above, however, the hitch can be rendered rigid by threading the set screws 68 inwardly against the tongues 66 of the hinge plates. Also, the hitch can be held against movement in one direction by threading one of the set screws in to the proper extent and locking the set screw in adjusted position by the lock nut 103.

The invention may be embodied in other specific forms without departing from the spirit or essential characteristics thereof. The present embodiments are therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In a tractor and implement assembly, a walking tractor having a frame and a pair of handles extending rearwardly from said frame, an implement support disposed to the rear of said frame, and a flexible hitch between said frame and said support comprising a pair of substantially parallel, spaced apart links each pivotally secured at its forward end to a respective side of said frame, means pivotally connecting each link to the adjacent handle, apertured hinge plates pivotally secured one to the rear end of each link, means detachably connecting said hinge plates to said implement support, and means on said hinge plates restraining said support against turning about said connecting means, said implement support comprising an inverted U-shaped yoke having apertures in the sides and implement attaching apertures in the end portions thereof, said connecting means comprising respective bolts extending through said hinge plates and the corresponding sides of said yoke, and said restraining means comprising a flange on the rearward edge of each hinge plate engaging the rearward edges of the sides of said yoke.

CARL R. NELSON.

REFERENCES CITED

The following references are of record in the file of this patent:

UNITED STATES PATENTS

| Number | Name | Date |
| --- | --- | --- |
| 1,553,919 | Smith | Sept. 15, 1925 |
| 2,151,117 | Kepler | Mar. 21, 1939 |
| 2,330,283 | Hipple | Sept. 28, 1943 |